US011449467B2

(12) United States Patent
Zhang et al.

(10) Patent No.: US 11,449,467 B2
(45) Date of Patent: Sep. 20, 2022

(54) WARMING UP INDEX FILES

(71) Applicant: Microsoft Technology Licensing, LLC, Redmond, WA (US)

(72) Inventors: Bingfeng Zhang, Redmond, WA (US); Xiaofan Li, Redmond, WA (US); Shuguang Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/045,959

(22) PCT Filed: May 7, 2019

(86) PCT No.: PCT/US2019/030982
§ 371 (c)(1),
(2) Date: Oct. 7, 2020

(87) PCT Pub. No.: WO2019/226318
PCT Pub. Date: Nov. 28, 2019

(65) Prior Publication Data
US 2021/0073181 A1 Mar. 11, 2021

(30) Foreign Application Priority Data
May 22, 2018 (CN) .......................... 201810493733.1

(51) Int. Cl.
*G06F 16/172* (2019.01)
*G06F 16/14* (2019.01)
*G06F 16/18* (2019.01)
(52) U.S. Cl.
CPC .......... *G06F 16/172* (2019.01); *G06F 16/144* (2019.01); *G06F 16/148* (2019.01); *G06F 16/156* (2019.01); *G06F 16/1847* (2019.01)

(58) Field of Classification Search
CPC .... G06F 16/172; G06F 16/144; G06F 16/148; G06F 16/156; G06F 16/1847;
(Continued)

(56) References Cited

U.S. PATENT DOCUMENTS 8,112,425 B2 2/2012 Baum et al.
8,136,025 B1 * 3/2012 Zhu ....................... G06F 16/951
715/200

(Continued)

FOREIGN PATENT DOCUMENTS

EP 3036662 A1 6/2016

OTHER PUBLICATIONS

"Split index", Retrieved from: https://web.archive.org/web/20190512093031if_/https://www.elastic.co/guide/en/elasticsearch/reference/6.7/indices-split-index.html/, Retrieved on: May 12, 2019, 5 Pages.

(Continued)

*Primary Examiner* — Robert W Beausoliel, Jr.
*Assistant Examiner* — Nirav K Khakhar
(74) *Attorney, Agent, or Firm* — Schwegman Lundberg & Woessner, P.A.

(57) ABSTRACT

The present disclosure provides a method, an apparatus and a search node for warming up index files during a search service. The search service is provided by at least one search node in a search system. A first index file is stored in a disk in the search node, and a first group of pages from the first index file is stored in a cache in the search node. A second index file is stored into the disk in the search node. A plurality of queries is received during the search service. At least one warm-up query is determined from the plurality of queries. A warm-up search is performed based on the second index file in response to the at least one warm-up query. A (Continued)

second group of pages in the second index file is stored into the cache based on a result of the warm-up search.

20 Claims, 10 Drawing Sheets

(58) Field of Classification Search
CPC .. G06F 16/951; G06F 16/167; G06F 16/1827; G06F 16/2228; G06F 16/2272; G06F 16/2291; G06F 16/2322; G06F 16/24568; G06F 16/24575; G06F 16/24578; G06F 16/2477; G06F 16/248; G06F 16/284; G06F 16/319; G06F 16/3349; G06F 16/9574

See application file for complete search history.

(56) References Cited

U.S. PATENT DOCUMENTS

| | | | |
|---|---|---|---|
| 8,165,988 | B2 | 4/2012 | Shau |
| 8,949,247 | B2 | 2/2015 | Torbjømsen |
| 2005/0080796 | A1* | 4/2005 | Midgley ............... G06F 16/275 |
| 2007/0055555 | A1 | 3/2007 | Baggett et al. |
| 2007/0234324 | A1 | 10/2007 | Ananthakrishnan et al. |
| 2012/0110015 | A1 | 5/2012 | Nath et al. |
| 2014/0289273 | A1* | 9/2014 | Embert ............... G06F 16/9574 |
| | | | 707/770 |
| 2014/0365533 | A1* | 12/2014 | Debray ............. G06F 16/24549 |
| | | | 707/803 |
| 2017/0039232 | A1* | 2/2017 | Jayanth ................. G06F 16/278 |
| 2017/0075577 | A1 | 3/2017 | Goldberg et al. |
| 2018/0196824 | A1* | 7/2018 | Bitincka ............... G06F 16/951 |
| 2019/0138639 | A1* | 5/2019 | Pal ........................ G06F 40/205 |
| 2020/0321073 | A1* | 10/2020 | Zhi ........................ G16B 20/40 |

OTHER PUBLICATIONS

"Tune for Search Speed", Retrieved from: https://web.archive.org/web/20181030070855/https://www.elastic.co/guide/en/elasticsearch/reference/master/tune-for-search-speed.html, Retrieved on: Oct. 30, 2018, 9 Pages.

"Warmers", Retrieved from: https://web.archive.org/web/20170209131709/https:/www.elastic.co/guide/en/elasticsearch/reference/1.7/indices-warmers.html, Feb. 9, 2017, 4 Pages.

Baeza-Yates, et al., "The Impact of Caching on Search Engines", In Proceedings of the 30th Annual International ACM SIGIR Conference on Research and Development in Information Retrieval, Jul. 23, 2007, pp. 183-190.

"International Search Report and Written Opinion Issued in PCT Application No. PCT/US19/030982", dated Jul. 9, 2019, 13 Pages.

"Office Action Issued in European Patent Application No. 19724711.7", dated Jul. 19, 2022, 5 Pages.

* cited by examiner

FIG 7

WARMING UP INDEX FILES

CROSS-REFERENCE TO RELATED APPLICATION

This application is a U.S. National Stage Filing under 35 U.S.C. 371 of International Patent Application Serial No. PCT/US2019/030982, filed May 7, 2019, and published as WO 2019/226318 A1 on Nov. 28, 2019, which claims priority to Chinese Application No. 201810493733.1 filed May 22, 2018; which applications and publication are incorporated herein by reference in their entirety.

BACKGROUND

Search service is widely used for providing content associated with a query request in response to the query request. The search service may be provided by various types of search system, e.g., a distributed search system, a centralized search system, etc. An index table may be used by a search system for providing search service. The index table comprises index information established for a large number of documents. When receiving a query, the search system may find content associated with the query through matching between the query and the index information in the index table. Usually, the index table may be stored in a form of index file in one or more search nodes included in the search system. These search nodes are configured for providing search service through the index file.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose a method, an apparatus and a search node for warming up index files during a search service. The search service is provided by at least one search node in a search system. A first index file is stored in a disk in the search node, and a first group of pages from the first index file is stored in a cache in the search node. A second index file may be stored into the disk in the search node. A plurality of queries may be received during the search service. At least one warm-up query may be determined from the plurality of queries. A warm-up search may be performed based on the second index file in response to the at least one warm-up query. A second group of pages in the second index file may be stored into the cache based on a result of the warm-up search.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

FIG. 7 illustrates an exemplary process for performing search based on a new index file at a search node after warming up is completed according to an embodiment.

DETAILED DESCRIPTION

Figure 1A:
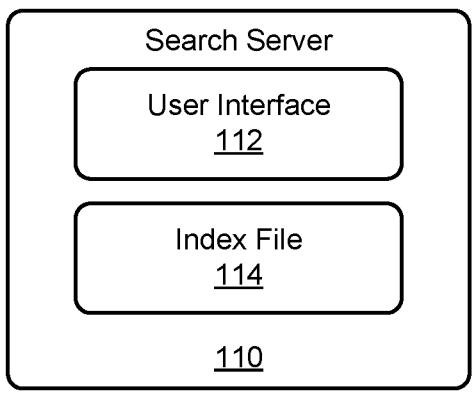
FIG. 1A and FIG. 1B illustrate architecture diagrams of exemplary search systems.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Index files may be stored in disks in search nodes included in a search system. Here, a disk may refer to any type of non-volatile storage device, which may be also referred to as hard disk, external storage device, etc. A search node may access an index file through input/output (I/O) operations to a disk, so as to perform search. An index file may be divided into a plurality of pages, each page having a predetermined size. Thus, the index file may be stored in the disk in a form of page.

Moreover, a cache may be set in a search node so as to improve search speed and search efficiency. The cache may be, e.g., a cache of a memory applied for the search node. Usually, a cache has a smaller size of space than a disk. The cache may be used for storing a set of frequently-used pages in the index file, including, e.g., recently-hit pages, frequently-hit pages, etc. Here, "hit a page" may indicate that index information associated with a query is found in this page. On one hand, a cache may provide a faster access speed than a disk, and thus the use of the cache may improve search speed. On the other hand, since the set of frequently-used pages is stored in the cache, search results for most queries may be obtained from the page set stored in the cache. When receiving a query, the search node may firstly try to perform search in the cache. If the search hits a page in the page set in the cache, then a search result may be provided based on the page in the cache. If no search result is obtained from the cache, the search may be further performed in the disk.

The page set in the cache may be dynamically stored or maintained in various approaches. In an approach, one or more recently-hit pages in the disk may be added into the page set in the cache. For example, for a new query, when index information associated with the query is searched out in a page in the disk, i.e., this page in the disk is hit, this page may be loaded into the page set in the cache. In an approach, pages in the cache may be ranked based on, e.g., hit numbers, hit freshness, etc. For example, if a page in the cache has a higher hit number, then this page will have a higher ranking in the cache. If a page in the cache has a more recent hit time, then this page will also have a higher ranking in the cache. In an approach, one or more pages having fewest hit numbers or failed to be hit recently may be removed from the cache, such that corresponding cache spaces may be allocated to pages with higher rankings.

When there is a new index file, the new index file may be enabled at the search node. Usually, in this case, the search node needs to firstly stop providing search service through the current index file, and remove the current index file stored in the disk and a page set from the current index file stored in the cache. Then, the search node stores the new index file into the disk. Next, the search node restarts, however it does not provide search service, but performs warm-up on the new index file with specific warm-up queries. Here, "warm-up" may refer to that, before providing search service based on the new index file, the search node loads, into the cache, a part of pages in the new index file stored in the disk that is possibly hit by following searches, thus avoiding that a large number of I/O operations will be performed to the disk in the following searches and accordingly cause latency regression of the search service. The specific warm-up queries may refer to queries previously prepared and specific for a warming up process, which may come from, e.g., a third-part tool, etc. During the warming up process, a search performed in response to a warm-up query may cause a hit page in the new index file stored in the disk to be loaded into the cache. After the warming up is completed, the search node may restart to provide search service through the new index file stored in the disk and/or the page set from the new index file stored in the cache. In the above-mentioned process for enabling the new index file, the search node needs to interrupt search service during the warming up, and needs to warm up the new index file with the specific warm-up queries.

Embodiments of the present disclosure propose to determine warm-up queries from actual queries received during a search service to be used for warming up a new index file, without the need of utilizing specific warm-up queries that are prepared previously. During warming up the new index file, the search node may still continue providing search service based on the current index file, without the need of interrupting the search service. The embodiments of the present disclosure further proposes to determine the warm-up queries from the actual queries received during the search service based on a gradually-increased query replication rate, wherein the query replication rate indicates a ratio of a number of the warm-up queries to a number of the actual queries. The gradually-increased query replication rate may ensure that I/O impact to the disk is reduced at the beginning phase of the warming up process, and a thorough and rapid warming up of the new index file may be achieved. The embodiments of the present disclosure are not limited to any particular types of index files, but may be applied for any scenarios in which not all pages in a new index file can be loaded into a cache.

FIG. 1A illustrates an architecture diagram of an exemplary search system 100A. The search system 100A is an example of a centralized search system. The centralized search system comprises a single index file, and the single index file is stored in the only search node included in the centralized search system. The search system 100A may comprise a search server 110. The search server 110 is configured for providing search service to users through a network. The search server 110 may be deemed as the only search node included in the search system 100A.

The search server 110 may comprise a user interface 112. The user interface 112 is configured for receiving queries from users and presenting search results in response to the queries to the users. The search server 110 may further comprise an index file 114. The index file 114 comprises index information previously established for a large number of documents, e.g., an index table. When the search server 110 receives a query through the user interface 112, the search server 110 may perform matching between the query and index information in the index file 114 to find index information associated with the query, and present a search result to the user through the user interface 112 based on the index information associated with the query.

Although not shown in FIG. 1A, it should be appreciated that the search server 110 may further comprise any other hardware components, software modules, information data, etc. associated with the providing of search service.

Figure 1B:
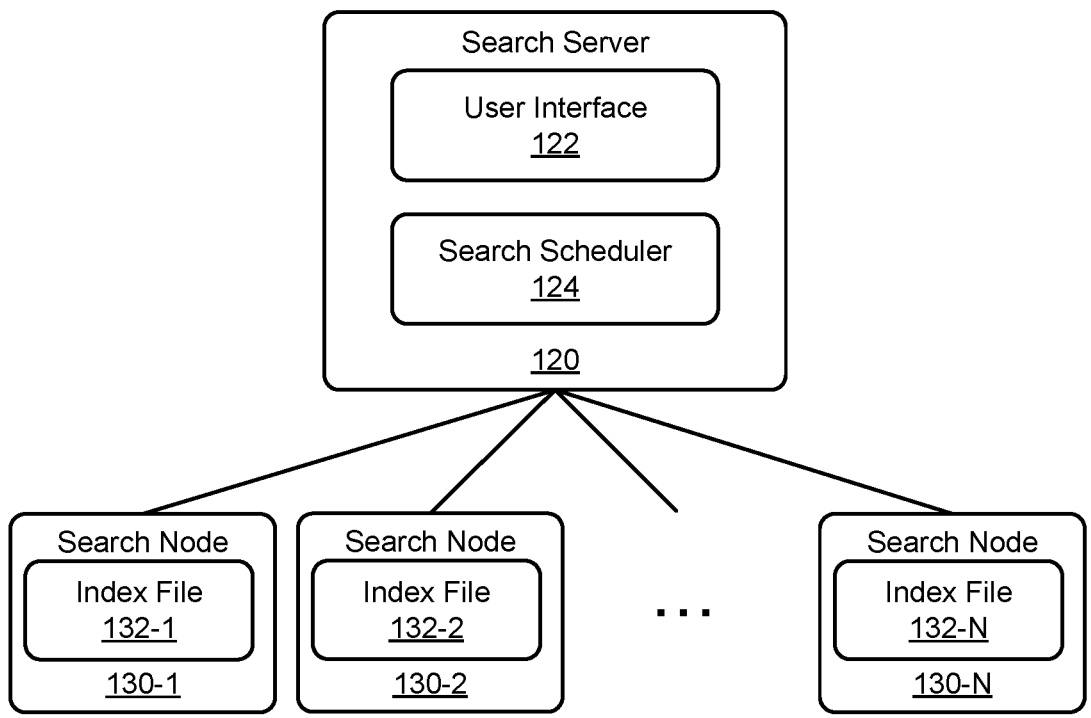

FIG. 1B illustrates an architecture diagram of an exemplary search system 100B. The search system 100B is an example of a distributed search system. The distributed search system may comprise a plurality of search nodes, each search node storing a corresponding index file. The distributed search system may provide search service through cooperation among the plurality of search nodes. As shown in FIG. 1B, the search system 100B may comprise a search server 120 and a plurality of search nodes 130-1, 130-2, . . . , 130-N, etc.

The search server 120 may comprise a user interface 122, which has a similar function with the user interface 112. The search server 120 may further comprise a search scheduler 124. The search scheduler 124 is configured for distributing a received query to each search node in the plurality of search nodes 130-1, 130-2, . . . , 130-N. The search scheduler 124 is further configured for collecting a plurality of search results from the plurality of search nodes to form a final search result, e.g., the plurality of search results may be combined, ranked, etc. so as to form the final search result.

Each search node in the plurality of search nodes 130-1, 130-2, . . . , 130-N comprises a corresponding index file. For example, the search node 130-1 comprises an index file 132-1, the search node 130-2 comprises an index file 132-2, the search node 130-N comprises an index file 132-N, etc. When receiving a query distributed by the search scheduler 124, each search node 130-$i$ (where $i=1, 2, \ldots, N$) performs search based on an index file 132-$i$ stored at this search node, and returns a search result obtained by this search node to the search server 120.

Although not shown in FIG. 1B, it should be appreciated that the search server 120 and each search node 130-$i$ may further comprise any other hardware components, software modules, information data, etc. associated with the providing of search service.

Figure 2:
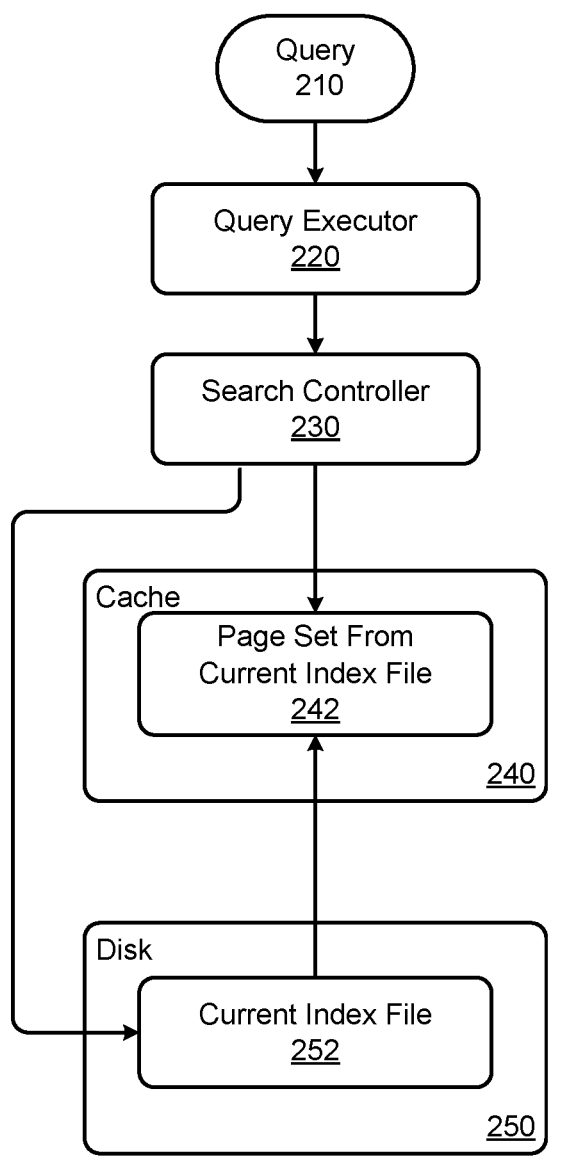
FIG. 2 illustrates an exemplary process for performing search at a search node in response to a query.

FIG. 2 illustrates an exemplary process 200 for performing search at a search node in response to a query. The search node involved in the process 200 may be the only search node included in a centralized search system or any one search node in a plurality of search nodes included in a distributed search system. The process 200 shows how the search node performs search based on the current index file during a search service.

During the search service, the search node may obtain a query 210 from a user.

The query 210 is provided to a query executor 220 in the search node. The query executor 220 is configured for parsing the query 210 to obtain key words or key expressions included in the query 210, and triggering a search operation for the query 210.

A search controller 230 in the search node may control, based on predetermined rules, to perform search in a cache 240 in the search node and/or to perform search in a disk 250 in the search node. The disk 250 stores the current index file 252, and the cache 240 stores a page set 242 from the current index file. In an implementation, the search controller 230 may control to firstly perform search in the page set 242 stored in the cache 240. For example, a matching may be performed between key words or key expressions included in the query 210 and index information in the page set 242, so as to try to find a page including index information associated with the query 210 from the page set 242. If the search hits a page in the page set 242, i.e., index information associated with the query 210 is found in this page, the search node may generate a search result based on the index information associated with the query 210 and return the search result. If the search does not hit any page in the page set 242, i.e., no search result is obtained from the page set 242 stored in the cache 240, the search controller 230 may control to further perform search in the current index file 252 stored in the disk 250. If the search hits a page in the current index file 252 stored in the disk 250, i.e., index information associated with the query 210 is found in this page, the search node may generate a search result based on the index information associated with the query 210 and return the search result. In one case, pages in the page set 242 may be dynamically updated with hit pages in the current index file 252. For example, pages in the current index file 252 that were hit may be added into the page set 242. Moreover, for example, after the hit pages in the current index file 252 are added into the page set 242, those pages with lowest rankings may be removed from the page set 242, so as to keep the size of the page set 242 unchanged.

It should be appreciated that the query executor 220, the search controller 230, etc. in the search node may be implemented as separate hardware components, such as, processors, controllers, etc., or may be implemented as software modules, such as, program codes, etc.

Figure 3:
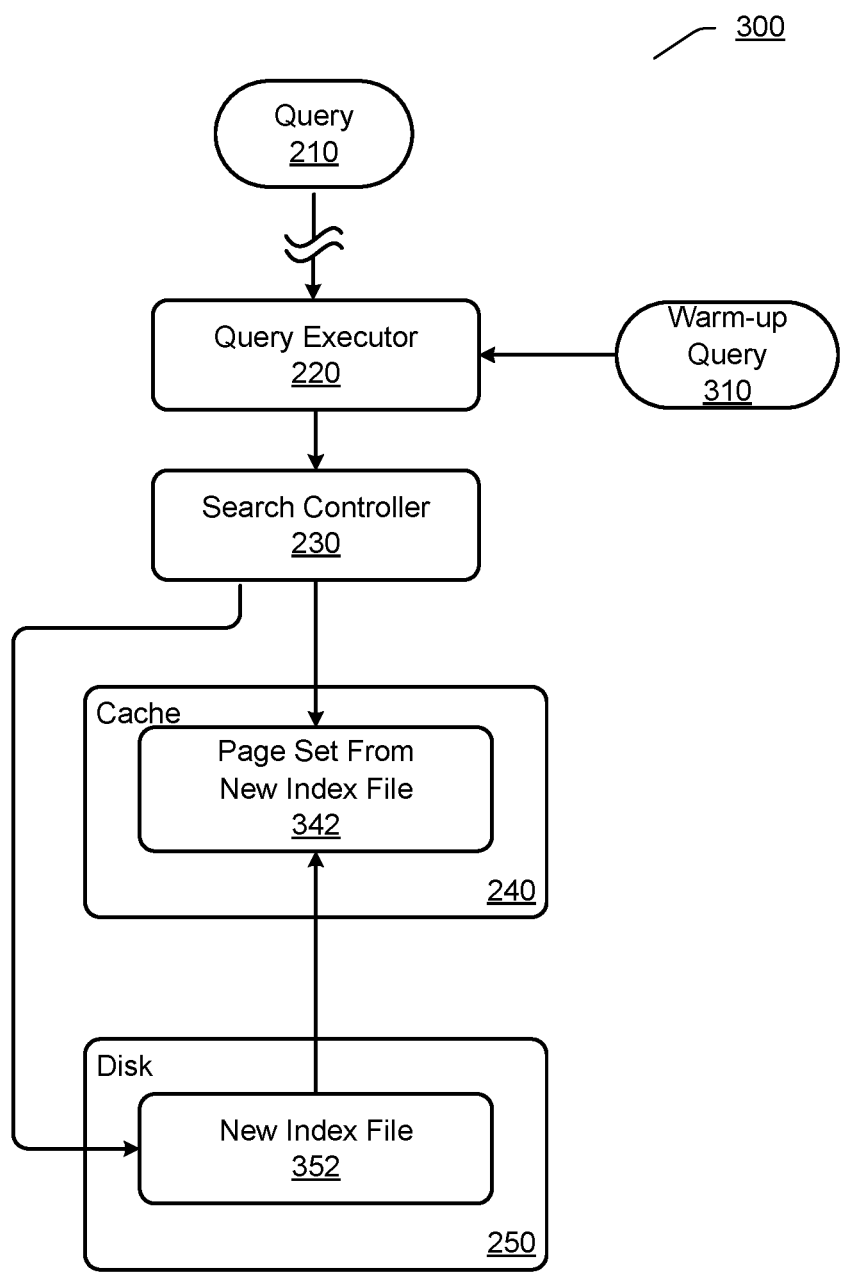
FIG. 3 illustrates an exemplary process for warming up a new index file at a search node.

FIG. 3 illustrates an exemplary process 300 for warming up a new index file at a search node. The search node in FIG. 3 is the same as the search node in FIG. 2, and thus the same reference numbers are used for indicating the same components. The process 300 may be performed for enabling a new index file at the search node.

In the process 300, when obtaining a new index file, the search node firstly stops providing search service. For example, a connection between the query 210 and the query executor 220 is cut off, thus no search will be performed in response to the query 210.

The search node removes the current index file 252 stored in the disk 250 and the page set 242 from the current index file stored in the cache 240. Then, the search node stores a new index file 352 into the disk 250. At this time, a page set 342 from the new index file stored in the cache 240 shown in FIG. 3 is null. After storing the new index file 352 into the disk 250, the search node restarts, but does not provide search service to users.

The query executor 220 in the search node receives a group of specific warm-up queries for warming up the new index file 352. The warm-up queries may be queries previously prepared and specific for a warming up process, which may come from, e.g., upper modules of the search node, a third-part tool, etc. When receiving a warm-up query 310, the query executor 220 parses the warm-up query 310 to obtain key words or key expressions included in the warm-up query 310, and triggers a search operation for the warm-up query 310.

The search controller 230 in the search node may control to firstly perform search in the page set 342 from the new index file 352 stored in the cache 240. At the beginning of the warming up process, the cache 240 does not store any pages from the new index file 352, i.e., the page set 342 is null, and thus no search result can be obtained in the cache 240. If it is determined that no search result can be obtained in the cache 240, the search controller 230 may control to further perform search in the new index file 352 stored in the disk 250. If the search hits a page in the new index file 352 stored in the disk 250, i.e., index information associated with the warm-up query 310 is found in this page, the search node may load this page to the cache 240, i.e., add this page to the page set 342 stored in the cache 240. With performing search in response to more and more warm-up queries during the warming up process, more and more pages in the new index file 352 are hit and loaded into the cache 240, and thus pages in the page set 342 stored in the cache 240 are increasing. Moreover, during the warming up process, the pages in the page set 342 may also be dynamically updated in a way as described above in connection with FIG. 2.

When the pages in the page set 342 fulfill the space of the cache 240 or occupy a predetermined ratio of the space of the cache 240, it may be determined that the warming up is completed. After the warming up is completed, a connection between the warm-up query 310 and the query executor 220 may be cut off, and thus no search will be performed in response to the warm-up query 310.

Figure 4:
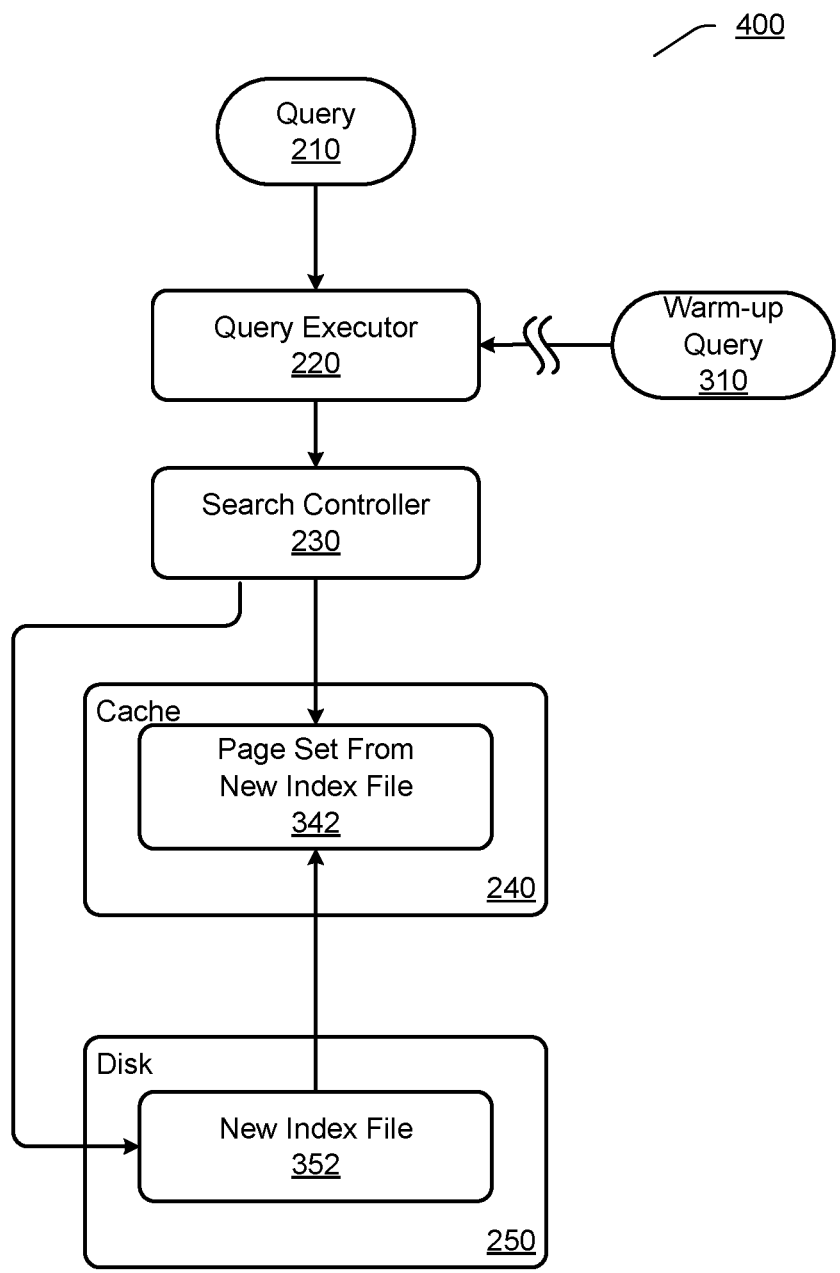
FIG. 4 illustrates an exemplary process for performing search based on a new index file at a search node after warming up is completed.

FIG. 4 illustrates an exemplary process 400 for performing search based on a new index file at a search node after warming up is completed. The process 400 is a continuation of the process 300.

As shown in FIG. 4, the connection between the warm-up query 310 and the query executor 220 is cut off, and the query 210 reconnects to the query executor 220 in the search node.

In FIG. 4, the search node has enabled the new index file. For example, the disk 250 stores the new index file 352, and the cache 240 stores the page set 342 from the new index file. The search node may provide search service in a similar way with the process 200 in FIG. 2, except that search will be performed based on the new index file. For example, in response to the query 210, the search node may perform search through the new index file 352 stored in the disk 250 and/or the page set 342 from the new index file stored in the cache 240, and returns a search result.

It should be appreciated that, in the process 300 and the process 400 discussed above in connection with FIG. 3 and FIG. 4, the search node needs to interrupt search service during the warming up, and needs to utilize specific warm-up queries to warm up a new index file.

The embodiments of the present disclosure propose to warm up a new index file concurrently with the providing of search service. That is, the new index file may be warmed up without interrupting the search service. Moreover, the embodiments of the present disclosure further propose to determine warm-up queries from "actual" queries received during the search service, to be used for warming up a new index file, without the need of utilizing the specific warm-up queries 310 that are additionally provided as shown in FIG. 3.

Figure 5:
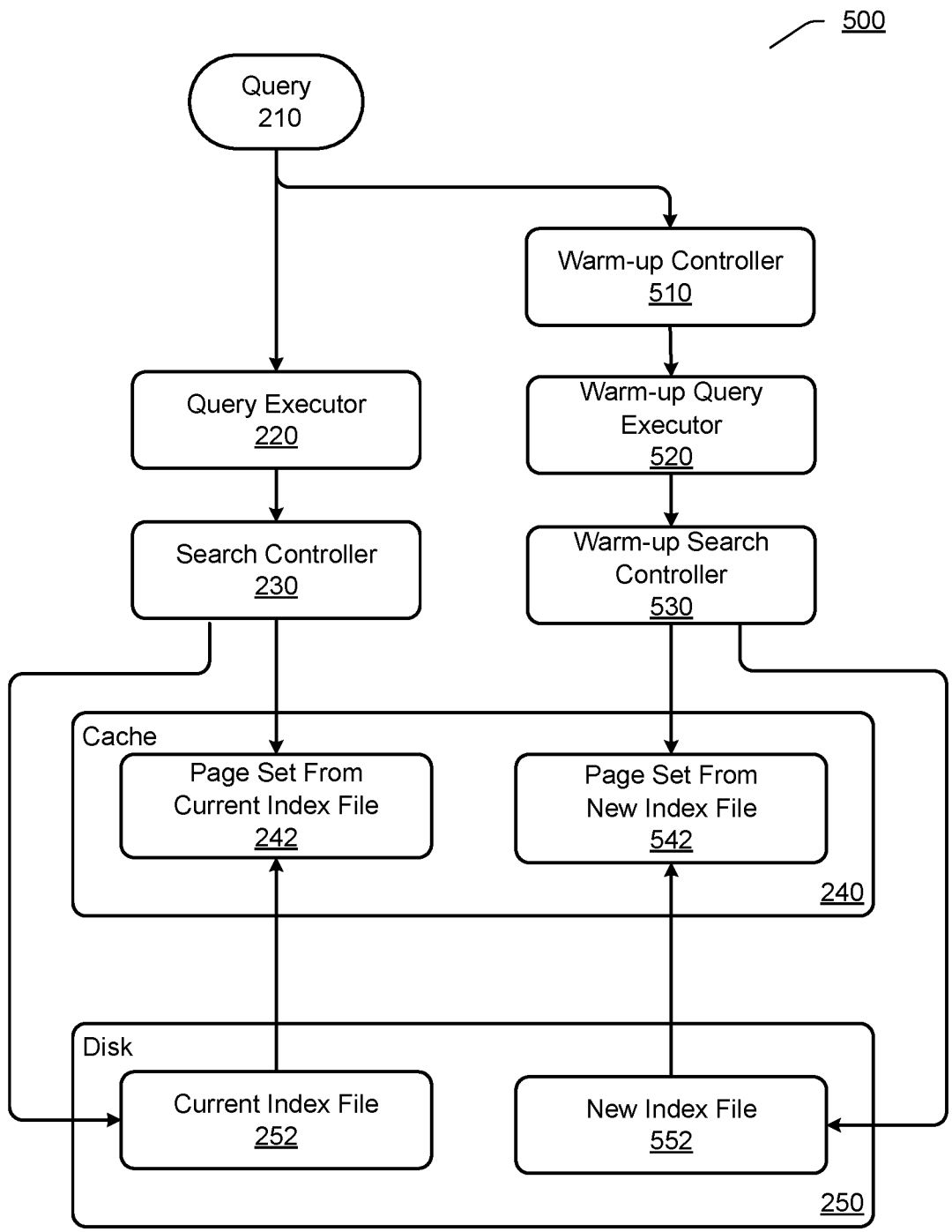
FIG. 5 illustrates an exemplary process for warming up a new index file at a search node according to an embodiment.

FIG. 5 illustrates an exemplary process 500 for warming up a new index file at a search node according to an embodiment. In FIG. 5, the warming up process and the search service are performed concurrently. For example, during the warming up process, the search node may still perform search in response to the query 210 received during the search service. Specifically, in a similar way as shown in FIG. 2, the query executor 220 and the search controller 230 in the search node may utilize the page set 242 from the current index file stored in the cache 240 and/or the current index file 252 stored in the disk 250 for returning a search result for the query 210 during the search service.

In the process 500, when obtaining a new index file 552, the search node may store the new index file 552 into the disk 250. The current index file 252 is also maintained in the disk 250 at the meantime, instead of being removed.

The search node may comprise a warm-up controller 510. The warm-up controller 510 may be configured for receiving a plurality of "actual" queries from users during the search service provided by the search node, and determining at least one warm-up query from the plurality of queries to be used for the warming up process. That is to say, the warm-up controller 510 may "replicate" a part of queries among the plurality of actual queries from the users as warm-up queries.

In an implementation, the warm-up controller 510 may determine the warm-up queries from the plurality of queries received during the search service based on a query replication rate. The query replication rate indicates a ratio of a number of the warm-up queries to a number of the actual queries, which ranges between 1% and 100%. For example, a query replication rate of 10% indicates that a ratio of a number of the warm-up queries to a number of the actual queries is 10%, which means that every 10 actual queries contain one warm-up query. Thus, based on the query replication rate of 10%, the warm-up controller 510 may select a warm-up query every other 9 actual queries. For example, if the current actual query m is determined as a warm-up query, then the m+10$^{th}$ actual query may be determined as the next warm-up query, etc.

In the process 500, it is assumed that the warm-up controller 510 determines the query 210 in a plurality of actual queries received during the search service as a warm-up query. A warm-up query executor 520 in the search node may parse the warm-up query 210 to obtain key words or key expressions included in the warm-up query 210, and trigger a warm-up search operation for the warm-up query 210.

A warm-up search controller 530 may control to firstly perform search in a page set 542 from the new index file 552 stored in the cache 240. At the beginning of the warming up process, the cache 240 does not store any pages from the new index file 552, i.e., the page set 542 is null, and thus no result of the warm-up search can be obtained in the cache 240. If it is determined that no result of the warm-up search can be obtained in the cache 240, the warm-up search controller 530 may control to further perform warm-up search in the new index file 552 stored in the disk 250. If the warm-up search hits a page in the new index file 552 stored in the disk 250, i.e., index information associated with the warm-up query 210 is found in this page, the search node may generate a search result based on the index information associated with the warm-up query 210. The search node may load this page to the cache 240, i.e., add this page to the page set 542 stored in the cache 240.

It should be appreciated that, with performing warm-up search in response to more and more warm-up queries during the warming up process, more and more pages in the new index file 552 are hit and loaded into the cache 240, and thus pages in the page set 542 stored in the cache 240 are increasing. In this case, the warm-up search may also hit a page in the page set 542 from the new index file stored in the cache 240, i.e., index information associated with the warm-up query 210 is found in this page, and the search node may generate a search result based on the index information associated with the warm-up query 210. Moreover, the search node may improve a ranking of this page in the cache 240 accordingly.

It can be seen that, in the process 500, with performing warm-up search in response to more and more warm-up queries, the pages in the page set 542 from the new index file stored in the cache 240 may also be dynamically updated in a way as described above in connection with FIG. 2.

In an implementation, the space of the cache 240 is fixed, i.e., having a predetermined size. In this case, before starting the warming up process, the space of the cache 240 is occupied by the page set 242 from the current index file. However, as the proceeding of the warming up process, pages included in the page set 542 from the new index file are increasing, and the space of the cache 240 occupied by the page set 542 is also larger and larger, thus forming a contention of the space of the cache 240 by the page set 242 and the page set 542. In order to effectively solve the contention, pages in the page set 242 and the page set 542 stored in the cache 240 may be dynamically updated together based on search hit frequency. Here, search hit frequency of a page may refer to how many searches will hit this page among a plurality of searches. If a page has a higher search hit frequency, this page will have a higher ranking in the cache too. If the space of the cache 240 has been entirely occupied, then when there is a new page to be loaded into the cache 240, a page with the lowest ranking will be removed from the cache 240 so as to make room for the new page.

In another implementation, the space of the cache 240 is changeable. For example, the cache 240 may assign separate spaces to the page set 242 from the current index file and the page set 542 from the new index file respectively, and the space assigned to the page set 542 may be continuously enlarged as the number of pages included in the page set 542 is increasing. In this case, the contention of the space of the cache 240 by the page set 242 and the page set 542 may be avoided, and thus pages in the page set 242 and pages in the page set 542 may be dynamically updated independently and respectively.

In the process 500, no matter obtaining a result of the warm-up search from the page set 542 from the new index file stored in the cache 240 in response to the warm-up query 210, or obtaining a result of the warm-up search from the new index file 552 stored in the disk 250 in response to the warm-up query 210, the search node will discard the result of the warm-up search, instead of returning the result of the warm-up search. For the query 210, the search node only returns to a user a result obtained through performing search in the page set 242 from the current index file stored in the cache 240 and/or the current index file 252 stored in the disk 250. This is because, before completing the warming up process, pages in the new index file 552 are not sufficiently loaded into the cache, which results in that a large number of I/O operations need to be performed on the disk 250 so as to obtain a result of the warm-up search in the new index file 552 stored in the disk 250. In contrast, since pages with higher search hit frequency in the current index file 252 have already been loaded into the page set 242 in the cache 240, there is a high probability to obtain a search result from the page set 242 stored in the cache 240, without the need of performing a large amount of accesses to the current index file 252 stored in the disk 250. Since I/O operations to the disk is much slower than accesses to the cache, for the same query, the speed of obtaining a search result through the warming up process would be very slow, and latency of providing the search result would be enlarged dramatically. Thus, in the process 500, the result of the warm-up search will be discarded.

In an implementation, in order to ensure that I/O impact to the disk is reduced at the beginning of the warming up process and achieve a thorough and rapid warming up of the new index file, the warm-up controller 510 may determine warm-up queries from a plurality of actual queries received during a search service based on gradually-increased query replication rate. Here, the gradually-increased query replication rate may refer to adopting a low query replication rate at the beginning of the warming up process, and gradually increasing the query replication rate to higher values as the proceeding of the warming up process. At the beginning of the warming up process, pages in the new index file 552 stored in the disk 250 have not been loaded into the cache yet or only a few of the pages were loaded into the cache, and thus when performing a warm-up search, it is needed to access the new index file 552 stored in the disk 250 so as to obtain a result of the warm-up query. In this phase, if the query replication rate is too high, i.e., there are too many warm-up queries, a large number of I/O operations to the disk 250 would be caused, which will deteriorate access efficiency to the current index file 252 stored in the disk 250 during the search service and lead to I/O impact to the disk. In order to solve this problem, a low query replication rate may be adopted at the beginning of the warming up process. As the proceeding of the warming up process, more and more pages in the new index file 552 stored in the disk 250 are loaded into the cache 240, and thus I/O operations to the disk 250 caused by warm-up searches would reduce gradually. In this case, the increased warm-up queries would not cause too much impact to the disk 250, and thus the query replication rate may be increased gradually to higher values. Through gradually increasing the query replication rate to higher values, it may be avoided that a thorough warm-up cannot be achieved because of adopting a low query replication rate all the time. For example, fewer warm-up queries may cause pages in the page set 542 loaded into the cache 240 through warm-up searches to have lower search hit frequency and accordingly have lower rankings in the cache, therefore, there is a risk that these pages would be replaced by pages in the page set 242 from the current index file 252 that have higher rankings. Higher query replication rate may increase warm-up queries, and further facilitate to improve rankings of the pages of the page set 542 in the cache. Moreover, through gradually increasing the query replication rate to higher values, this may also facilitate to shorten a time duration of the warming up process such that a thorough warm-up may be achieved rapidly.

Figure 6:
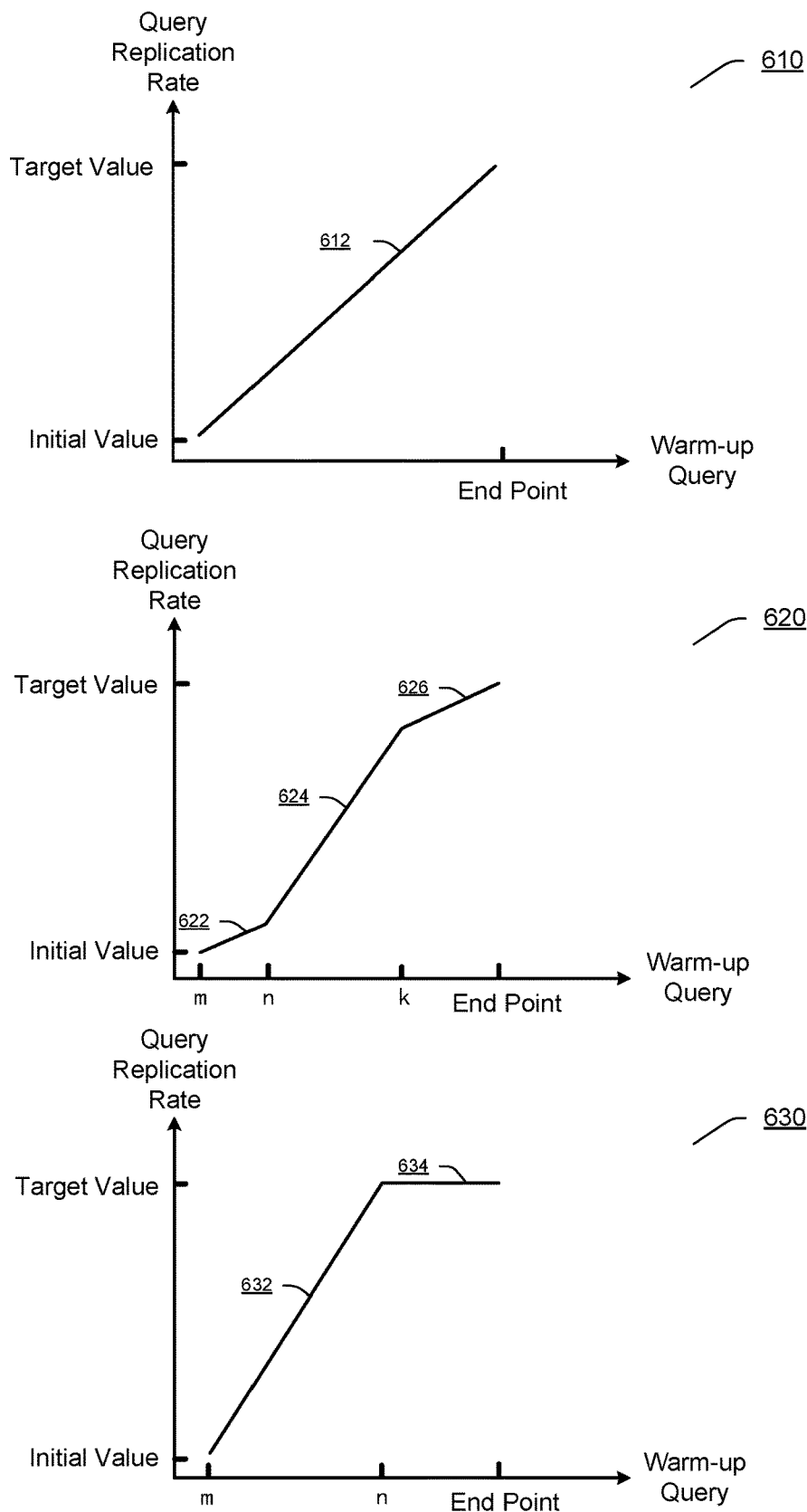
FIG. 6 illustrates exemplary diagrams of changing of query replication rate according to an embodiment.

During the warming up process, increasing speed, from a lower value to higher values, of the query replication rate may be fixed or variable. FIG. 6 illustrates exemplary diagrams of changing of query replication rate according to an embodiment. In FIG. 6, the X axis represents the number of warm-up queries, and the Y axis represents the query replication rate.

In diagram 610, the increasing speed of the query replication rate is fixed.

Line 612 indicates changing of the query replication rate as the number of warm-up queries increases. The line 612 has a fixed slope, which indicates that the query replication rate may maintain a fixed increasing speed during increasing from an initial value to a target value.

In diagram 620, the increasing speed of the query replication rate is variable.

Line 622 indicates changing of the query replication rate between the $m^{th}$ warm-up query and the $n^{th}$ warm-up query during the beginning phase of the warming up process. The line 622 has a small slope, which indicates that the increasing speed of the query replication rate is slow during the beginning phase of the warming up process. Through setting a slow increasing speed of the query replication rate during the beginning phase of the warming up process, excessive I/O impact to the disk may be avoided.

Line 624 indicates changing of the query replication rate between the $n^{th}$ warm-up query and the $k^{th}$ warm-up query. The line 624 has a larger slope, which indicates that the increasing speed of the query replication rate is faster. Through setting a faster increasing speed of the query replication rate during the middle phase of the warming up process, the speed of the warming up may be accelerated and the time duration of the warming up process may be shorten.

Line 626 indicates changing of the query replication rate between the $k^{th}$ warm-up query and the end point. The line 626 has a smaller slope, which indicates that the increasing speed of the query replication rate is slower during the late phase of the warming up process. Through setting a slower increasing speed of the query replication rate during the late phase of the warming up process, the CPU occupation rate of the search node may be reduced and the system processing pressure may be lowered.

In diagram 630, the increasing speed of the query replication rate is variable.

Line 632 indicates changing of the query replication rate between the $m^{th}$ warm-up query and the $n^{th}$ warm-up query. The line 632 has a large slope, which indicates that the increasing speed of the query replication rate is fast. Line 634 indicates changing of the query replication rate between the $n^{th}$ warm-up query and the end point. The slope of the line 634 is zero, which indicates that the query replication rate is kept at the target value without changing. In diagram 630, through setting a faster increasing speed of the query replication rate during the earlier phase of the warming up process, the speed of the warming up may be effectively accelerated and the time duration of the warming up process may be shorten. Through keeping the query replication rate at the target value during the latter phase of the warming up process, rankings of pages of the page set 542 from the new index file in the cache 240 may be effectively maintained or improved.

It should be appreciated that FIG. 6 only shows some examples of changing of the query replication rate. In the case of adopting a gradually-increasing query replication rate, the embodiments of the present disclosure would cover any other changing scenarios of the query replication rate.

Moreover, the initial value of the query replication rate in FIG. 6 may be any value indicating a low query replication rate, e.g., 1%, 2%, etc. The target value of the query replication rate in FIG. 6 may be any value indicating a high query replication rate, e.g., 95%, 100%, etc.

In the process 500 of FIG. 5, the warm-up controller 510 may determine whether the warming up process is completed. The warm-up controller 510 may determine whether a thorough warm-up of the new index file 552 is completed based on various criteria. For example, when a search hit rate of the page set 542 from the new index file stored in the cache 240 is equal to a search hit rate of the page set 242 from the current index file stored in the cache 240, or when a search hit rate of the page set 542 from the new index file stored in the cache 240 reaches a predetermined ratio (e.g., 90%) of a search hit rate of the page set 242 from the current index file stored in the cache 240, the warm-up controller 510 may determine that the warming up process is completed. Here, the search hit rate refers to, for a received query, probability of obtaining a search result in a page set stored in the cache. As the proceeding of the warming up process, the search hit rate of the page set 542 from the new index file stored in the cache 240 will increase gradually, and when the search hit rate of the page set 542 reaches or is close to the search hit rate of the page set 242 from the current index file, it may be deemed that a thorough warm-up of the new index file 552 has been completed.

In an implementation, the warm-up controller 510 may determine whether the search hit rate of the page set 542 reaches or is close to the search hit rate of the page set 242 based on whether a number of warm-up queries for the warming up process reaches a predetermined number, and accordingly determine whether the warming up process is completed. The "predetermined number" may be a priori value obtained through a previous test process. The test process may adopt a test index file with the same size as the new index file 552, and try to warm up the test index file with warm-up queries. When a search hit rate of a page set from the test index file stored in the cache is equal to a search hit rate of the page set from the current index file stored in the cache, or reaches a predetermined ratio of a search hit rate of the page set from the current index file stored in the cache, the number of warm-up queries that have already been used may be recorded as an end reference value for determining the completion of warming up process, i.e., a "predetermined number" of warm-up queries for determining whether the warming up process is completed. When warming up the new index file 552 in the process 500, if the warm-up controller 510 determines that a number of warm-up queries reaches the end reference value, it may be determined that the warming up process of the new index file 552 is completed. In this implementation, the end point in FIG. 6 may be the predetermined number of the warm-up queries as mentioned above.

In another implementation, the warm-up controller 510 may determine whether the search hit rate of the page set 542 reaches or is close to the search hit rate of the page set 242 based on whether a time duration for performing warm-up queries reaches a predetermined time duration, and accordingly determine whether the warming up process is completed. The "predetermined time duration" may be a priori value obtained through a previous test process. The test process may adopt a test index file with the same size as the new index file 552, and try to warm up the test index file with warm-up queries. When a search hit rate of a page set from the test index file stored in the cache is equal to a search hit rate of the page set from the current index file stored in the cache, or reaches a predetermined ratio of a search hit rate of the page set from the current index file stored in the cache, a time duration for performing warm-up queries so far may be recorded as an end reference value for determining the completion of warming up process. When warming up the new index file 552 in the process 500, if the warm-up controller 510 determines that a time duration for performing warm-up queries reaches the end reference value, it may be determined that the warming up process of the new index file 552 is completed. In this implementation, corresponding variants may be applied for the diagrams in FIG. 6, wherein the X axis may represent time for performing warm-up queries, instead of a number of the warm-up queries. For example, the section from point m to point n on the X axis may represent a time duration from a time point m to a time point n. Accordingly, the end point in FIG. 6 may be the predetermined time duration for performing the warm-up queries as mentioned above.

It should be appreciated that the warm-up controller 510, the warm-up query executor 520, the warm-up search controller 530, etc. in the search node may be implemented as separate hardware components, e.g., processors, controllers, etc., or may be implemented as software modules, e.g., program codes, etc.

Figure 7:
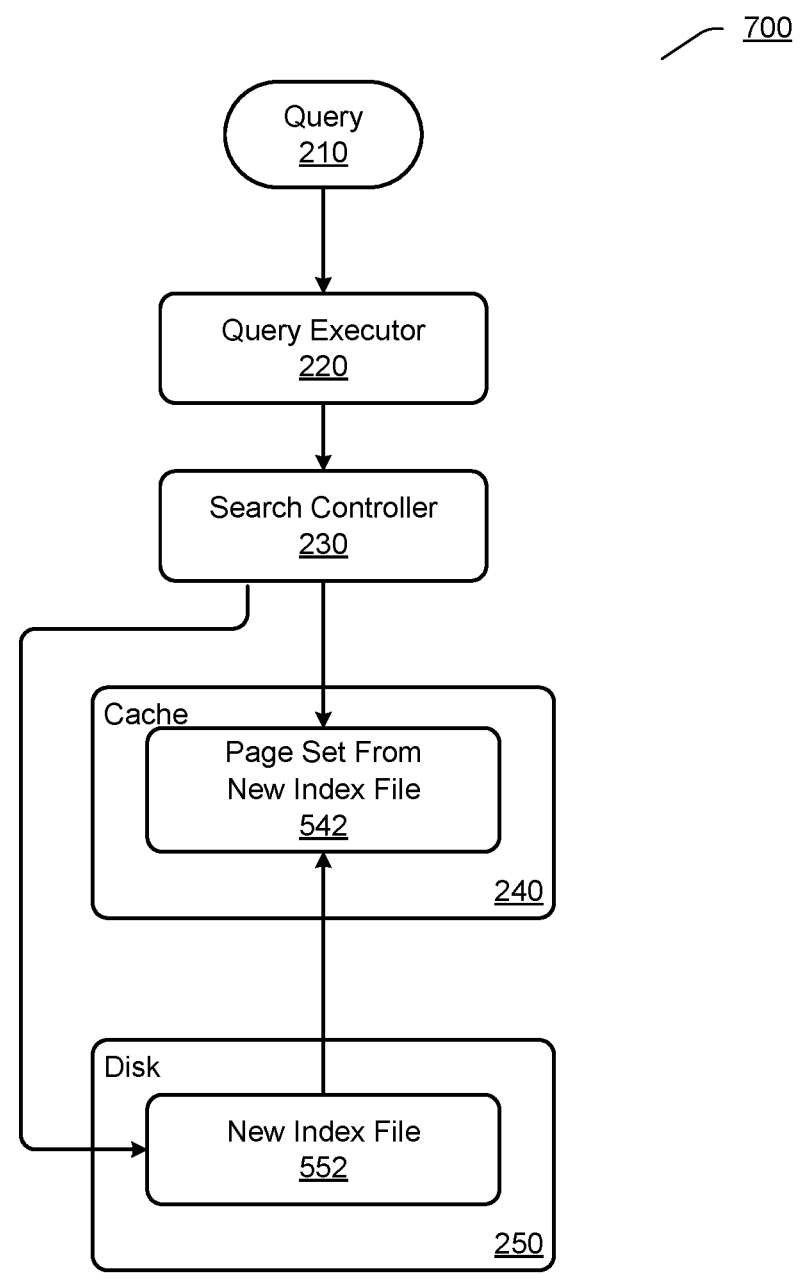

FIG. 7 illustrates an exemplary process 700 for performing search based on a new index file at a search node after warming up is completed according to an embodiment. The process 700 is a continuation of the process 500.

After the warm-up controller 510 determines that the warming up process is completed in the process 500, search service may be provided based on the new index file in the process 700. For example, in response to the query 210, a search may be performed in the new index file 552 stored in the disk 250 and/or in the page set 542 from the new index file stored in the cache 240, and a search result may be returned.

As shown in FIG. 7, after the completion of the warming up process, the current index file 252 stored in the disk 250 and the page set 242 from the current index file stored in the cache 240 are all removed. Moreover, the warm-up controller 510, the warm-up query executor 520 and the warm-up search controller 530 in the search node will not operate any more. The query executor 220 and the search controller 230 in the search node will operate in a similar way with the process 200 in FIG. 2, except that searches will be performed based on the new index file.

Figure 8:
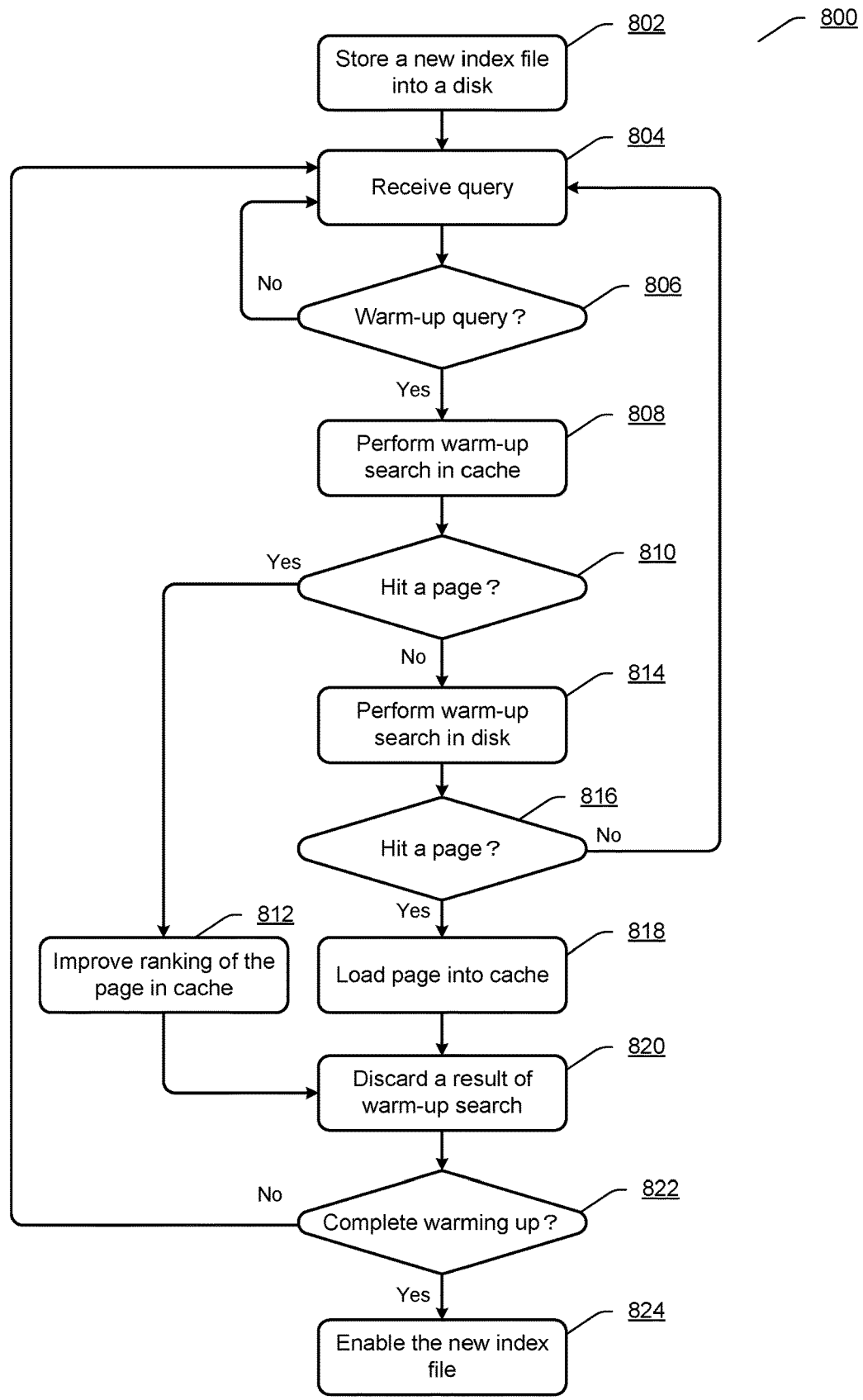
FIG. 8 illustrates an exemplary process for warming up an index file during a search service according to an embodiment.

FIG. 8 illustrates an exemplary process 800 for warming up an index file during a search service according to an embodiment. It should be appreciated that, although FIG. 8 shows a plurality of exemplary sequential steps, the process 800 is not limited to any special orders of these steps, and any one or more steps may be removed or replaced from the process 800.

At 802, a new index file may be stored in a disk of a search node.

At 804, a query may be received during a search service. For example, the query may be an actual query from a user.

At 806, it may be determined whether the query received at 804 is a warm-up query. For example, it may be determined whether the query received at 804 is a warm-up query based on a query replication rate. If it is determined at 806 that the query received at 804 is not a warm-up query, the process 800 returns to 804 so as to continue receiving subsequent queries during the search service. If it is determined at 806 that the query received at 804 is a warm-up query, the process 800 proceeds to 808.

At 808, in response to the warm-up query, a warm-up search may be performed in a cache of the search node. For example, the warm-up search may be performed in a page set from the new index file stored in the cache.

At 810, it may be determined whether the warm-up search hits a page in the page set from the new index file stored in the cache, i.e., whether a result of the warm-up search is obtained from the page set.

If it is determined at 810 that the warm-up search hits a page in the page set, i.e., a result of the warm-up search is obtained from the page set, the process 800 proceeds to 812. At 812, a ranking of the hit page in the cache may be improved. Then, the process 800 proceeds to 820, and the result of the warm-up search obtained from the page set is discarded.

If it is determined at 810 that the warm-up search does not hit any page in the page set, i.e., no result of the warm-up search is obtained from the page set, the process 800 proceeds to 814.

At 814, in response to the warm-up query, a warm-up search may be performed in the disk of the search node. For example, the warm-up search may be performed in the new index file stored in the disk.

At 816, it may be determined whether the warm-up search hits a page of the new index file stored in the disk, i.e., whether a result of the warm-up search is obtained from the new index file stored in the disk.

If it is determined at 816 that the warm-up search hits a page in the new index file, i.e., a result of the warm-up search is obtained from the new index file stored in the disk, the process 800 proceeds to 818. At 818, the hit page may be loaded into the cache, e.g., added into the page set from the new index file stored in the cache. Then, the process 800 proceeds to 820, and the result of the warm-up search obtained from the new index file is discarded.

If it is determined at 816 that the warm-up search does not hit any page in the new index file stored in the disk, i.e., no result of the warm-up search is obtained from the new index file, the process 800 returns to 804 so as to continue receiving subsequent queries during the search service.

At 822, it may be determined whether the warming up is completed. For example, it may be determined whether the warming up is completed based on whether a number of warm-up queries that have been already processed reaches a predetermined number, or based on whether a time duration for performing warm-up queries reaches a predetermined time duration.

If it is determined at 822 that the warming up is not completed yet, the process 800 returns to 804 so as to continue receiving subsequent queries during the search service.

If it is determined at 822 that the warming up is completed, the new index file is enabled at 824. During the following search service, search service may be provided based on the new index file. For example, in response to a query from a user, a search may be performed in the new index file stored in the disk and/or in the page set from the new index file stored in the cache, and a search result may be returned. Moreover, the current index file stored in the disk and the page set from the current index file stored in the cache may be removed.

Figure 9:
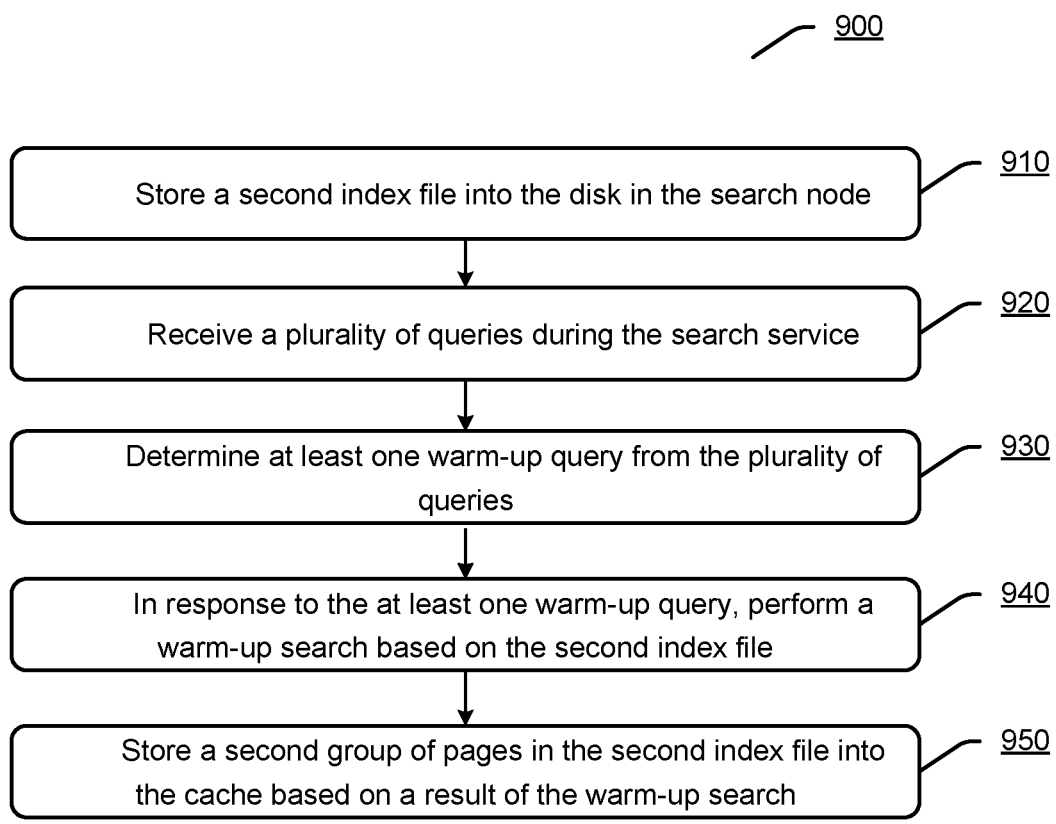
FIG. 9 illustrates a flowchart of an exemplary method for warming up index files during a search service according to an embodiment.

FIG. 9 illustrates a flowchart of an exemplary method 900 for warming up index files during a search service according to an embodiment. The search service is provided by at least one search node in a search system. A first index file is stored in a disk in the search node and a first group of pages from the first index file is stored in a cache in the search node.

At 910, a second index file may be stored into the disk in the search node.

At 920, a plurality of queries may be received during the search service.

At 930, at least one warm-up query may be determined from the plurality of queries.

At 940, in response to the at least one warm-up query, a warm-up search may be performed based on the second index file.

At 950, a second group of pages in the second index file may be stored into the cache based on a result of the warm-up search.

In an implementation, the performing the warm-up search may comprise: in response to the at least one warm-up query, performing the warm-up search in the second group of pages from the second index file stored in the cache. In this case, the storing the second group of pages into the cache may comprise: if the result of the warm-up search is obtained through at least one page in the second group of pages, improving a ranking of the at least one page in the second group of pages in the cache. The performing the warm-up search may comprise: if the result of the warm-up search is not obtained in the second group of pages, then in response to the at least one warm-up query, performing the warm-up search in the second index file stored in the disk. In this case, the storing the second group of pages into the cache may comprise: if the result of the warm-up search is obtained through at least one page in the second index file, adding the at least one page in the second index file into the second group of pages stored in the cache.

In an implementation, the method 900 may further comprise: discarding the result of the warm-up search.

In an implementation, the method 900 may further comprise: in response to the at least one warm-up search, performing search in the first index file stored in the disk and/or in the first group of pages stored in the cache; and returning a result of the search.

In an implementation, the method 900 may further comprise: after the warming up is completed, removing the first index file from the disk and removing the first group of pages from the cache.

In an implementation, the method 900 may further comprise: after the warming up is completed, returning search results during the search service through the second group of pages stored in the cache and/or the second index file stored in the disk.

In an implementation, the cache has a predetermined size, and the first group of pages and the second group of pages may be dynamically updated according to search hit frequency.

In an implementation, the determining the at least one warm-up query may comprise: selecting the at least one warm-up query from the plurality of queries based on a query replication rate, wherein the query replication rate indicates a ratio of a number of the at least one warm-up query to a number of the plurality of queries.

In an implementation, the query replication rate may increase gradually during the warming up. An increasing speed of the query replication rate may be fixed or variable. When the warming up is completed, the query replication rate may be equal to or below 100%.

In an implementation, the method 900 may further comprise: determining completion of the warming up based on that a number of the at least one warm-up query reaches a predetermined number, or based on that a time duration for performing the at least one warm-up query reaches a predetermined time duration. The predetermined number or the predetermined time duration may indicate that a search hit rate of the second group of pages is equal to a search hit rate of the first group of pages, or a search hit rate of the second group of pages reaches a predetermined ratio of a search hit rate of the first group of pages.

It should be appreciated that the method 900 may further comprise any steps/processes for warming up index files during a search service according to the embodiments of the present disclosure as mentioned above.

Figure 10:
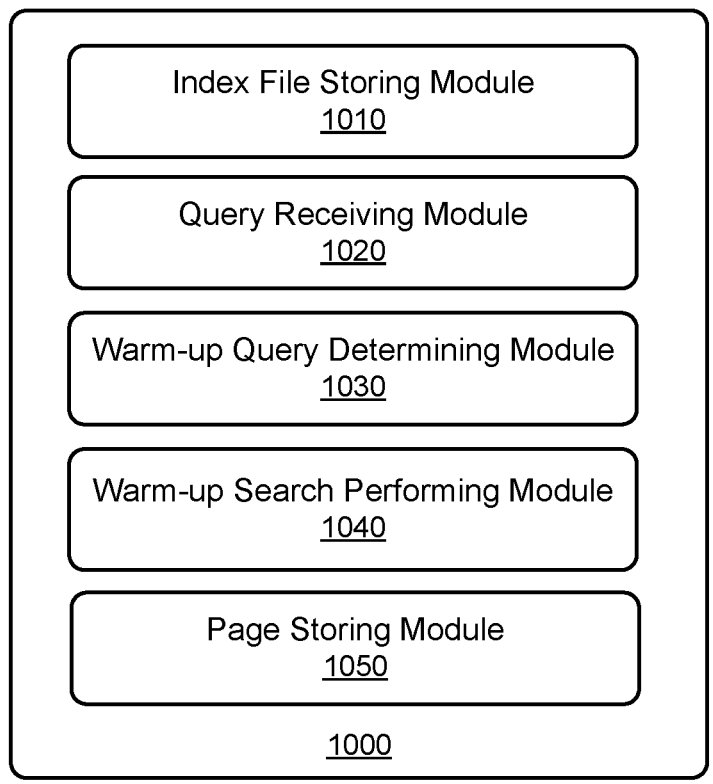
FIG. 10 illustrates an exemplary apparatus for warming up index files during a search service according to an embodiment.

FIG. 10 illustrates an exemplary apparatus 1000 for warming up index files during a search service according to an embodiment. The search service is provided by at least one search node in a search system. A first index file is stored in a disk in the search node and a first group of pages from the first index file is stored in a cache in the search node.

The apparatus 1000 may comprise: an index file storing module 1010 for storing a second index file into the disk in the search node; a query receiving module 1020 for receiving a plurality of queries during the search service; a warm-up query determining module 1030 for determining at least one warm-up query from the plurality of queries; a warm-up search performing module 1040 for, in response to the at least one warm-up query, performing a warm-up search based on the second index file; and a page storing module 1050 for storing a second group of pages in the second index file into the cache based on a result of the warm-up search.

Moreover, the apparatus 1000 may also comprise any other modules configured for performing any other operations of a method for warming up index files during a search service according to the embodiments of the present disclosure as mentioned above.

Figure 11:
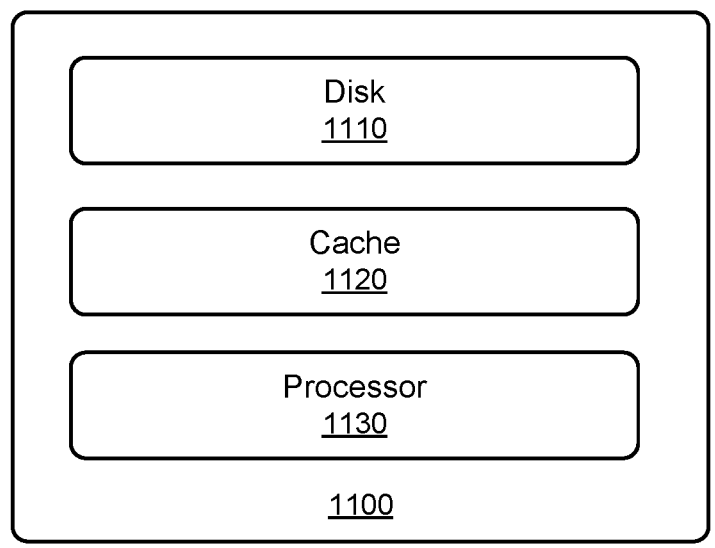
FIG. 11 illustrates an exemplary search node configured for warming up index files during a search service according to an embodiment.

FIG. 11 illustrates an exemplary search node 1100 configured for warming up index files during a search service according to an embodiment. The search node 1100 may provide a search service in a search system.

The search node 1100 may comprise: a disk 1110, storing a first index file; a cache 1120, storing a first group of pages from the first index file; and a processor 1130. The processor 1130 may be configured for: storing a second index file into the disk; receiving a plurality of queries during the search service; determining at least one warm-up query from the plurality of queries; in response to the at least one warm-up query, performing a warm-up search based on the second index file; and storing a second group of pages in the second index file into the cache based on a result of the warm-up search.

In an implementation, the processor 1130 may be further configured for: in response to the at least one warm-up query, performing the warm-up search in the second group of pages from the second index file stored in the cache; and if the result of the warm-up search is obtained through at least one page in the second group of pages, improving a ranking of the at least one page in the second group of pages in the cache.

In an implementation, the processor 1130 may be further configured for: if the result of the warm-up search is not obtained in the second group of pages, then in response to the at least one warm-up query, performing the warm-up search in the second index file stored in the disk; and if the result of the warm-up search is obtained through at least one page in the second index file, adding the at least one page in the second index file into the second group of pages stored in the cache.

It should be appreciated that the processor 1130 may be further configured for performing any other operations of the method for warming up index files during a search service according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the method for warming up index files during a search service according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for warming up index files during a session of a search service, wherein the search service is provided by at least one search node in a search system, a first index file is stored in a disk in the search node and a first group of pages from the first index file is stored in a cache in the search node, the method comprising:
storing a second index file into the disk in the search node;
receiving a plurality of queries during the session;
replicating a portion of the plurality of queries to form at least one warm-up query;
pausing the search service at the search node to prevent execution of the plurality of queries;
executing the at least one warm-up query via the search service at the search node;
in response to execution of the at least one warm-up query, performing a warm-up search based on the second index file; and
storing a second group of pages in the second index file into the cache based on a result of the warm-up search.

2. The method of claim 1, wherein the performing the warm-up search comprises:
in response to the at least one warm-up query, performing the warm-up search in the second group of pages from the second index file stored in the cache.

3. The method of claim 2, wherein the storing the second group of pages into the cache comprises:
if the result of the warm-up search is obtained through at least one page in the second group of pages, improving a ranking of the at least one page in the second group of pages in the cache.

4. The method of claim 2, wherein the performing the warm-up search comprises:
if the result of the warm-up search is not obtained in the second group of pages, then in response to the at least one warm-up query, performing the warm-up search in the second index file stored in the disk.

5. The method of claim 4, wherein the storing the second group of pages into the cache comprises:
if the result of the warm-up search is obtained through at least one page in the second index file, adding the at least one page in the second index file into the second group of pages stored in the cache.

6. The method of claim 1, further comprising:
discarding the result of the warm-up search.

7. The method of claim 1, further comprising:
in response to the at least one warm-up search, performing search in the first index file stored in the disk and/or in the first group of pages stored in the cache; and
returning a result of the search.

8. The method of claim 1, further comprising:
after the warming up is completed, returning search results during the search service through the second group of pages stored in the cache and/or the second index file stored in the disk.

9. The method of claim 1, wherein the determining the at least one warm-up query comprises:
selecting the at least one warm-up query from the plurality of queries based on a query replication rate, wherein the query replication rate indicates a ratio of a number of the at least one warm-up query to a number of the plurality of queries.

10. The method of claim 9, wherein
the query replication rate increases gradually during the warming up.

11. The method of claim 1, further comprising:
determining completion of the warming up based on that a number of the at least one warm-up query reaches a predetermined number, or based on that a time duration for performing the at least one warm-up query reaches a predetermined time duration.

12. A search node for providing a session of a search service in a search system, comprising:
a disk, storing a first index file;
a cache, storing a first group of pages from the first index file; and
a processor, configured for:
storing a second index file into the disk;
receiving a plurality of queries during the session;
replicating a portion of the plurality of queries to form at least one warm-up query;
pausing the search service at the search node to prevent execution of the plurality of queries;
executing the at least one warm-up query via the search service at the search node;
in response to execution of the at least one warm-up query, performing a warm-up search based on the second index file; and
storing a second group of pages in the second index file into the cache based on a result of the warm-up search.

13. The search node of claim 12, wherein the processor is further configured for:
in response to the at least one warm-up query, performing the warm-up search in the second group of pages from the second index file stored in the cache; and
if the result of the warm-up search is obtained through at least one page in the second group of pages, improving a ranking of the at least one page in the second group of pages in the cache.

14. The search node of claim 13, wherein the processor is further configured for:
if the result of the warm-up search is not obtained in the second group of pages, then in response to the at least one warm-up query, performing the warm-up search in the second index file stored in the disk; and
if the result of the warm-up search is obtained through at least one page in the second index file, adding the at least one page in the second index file into the second group of pages stored in the cache.

15. An apparatus for warming up index files during a session of a search service, wherein the search service is provided by at least one search node in a search system, a first index file is stored in a disk in the search node and a first group of pages from the first index file is stored in a cache in the search node, the apparatus comprising:
at least one processor; and
memory including instructions that, when executed by the at least one processor, cause the at least one processor to perform operations to:
store a second index file into the disk in the search node;
receive a plurality of queries during the session;
replicate a portion of the plurality of queries to form at least one warm-up query from the plurality of queries;
pause the search service at the search node to prevent execution of the plurality of queries;

execute the at least one warm-up query via the search service at the search node;

in response to execution of the at least one warm-up query, perform a warm-up search based on the second index file; and store a second group of pages in the second index file into the cache based on a result of the warm-up search.

16. The apparatus of claim 15, wherein the instructions to perform the warm-up search comprises instructions that, when executed by the at least one processor, cause the at least one processor to perform operations to:

in response to the at least one warm-up query, perform the warm-up search in the second group of pages from the second index file stored in the cache.

17. The apparatus of claim 16, wherein the instructions to store the second group of pages into the cache comprises instructions that, when executed by the at least one processor, cause the at least one processor to perform operations to:

if the result of the warm-up search is obtained through at least one page in the second group of pages, improve a ranking of the at least one page in the second group of pages in the cache.

18. The apparatus of claim 16, wherein the instructions to perform the warm-up search comprises instructions that, when executed by the at least one processor, cause the at least one processor to perform operations to:

if the result of the warm-up search is not obtained in the second group of pages, then in response to the at least one warm-up query, perform the warm-up search in the second index file stored in the disk.

19. The apparatus of claim 18, wherein the instructions to store the second group of pages into the cache comprises instructions that, when executed by the at least one processor, cause the at least one processor to perform operations to:

if the result of the warm-up search is obtained through at least one page in the second index file, add the at least one page in the second index file into the second group of pages stored in the cache.

20. The apparatus of claim 15, the memory further comprising instructions that, when executed by the at least one processor, cause the at least one processor to perform operations to:

discard the result of the warm-up search.

* * * * *